United States Patent [19]  [11] 4,284,164
Airhart  [45] Aug. 18, 1981

[54] ACOUSTIC PULSE GENERATOR

[75] Inventor: Tom P. Airhart, Plano, Tex.

[73] Assignee: Atlantic Richfield Company, Los Angeles, Calif.

[21] Appl. No.: 107,009

[22] Filed: Dec. 21, 1979

[51] Int. Cl.³ ............... G01V 1/137; G01V 1/047
[52] U.S. Cl. ............................... 181/117; 124/75
[58] Field of Search .......... 181/113, 117, 119, 121, 181/401, 120; 175/1; 404/133; 124/75

[56] References Cited

U.S. PATENT DOCUMENTS

| | | | |
|---|---|---|---|
| 2,489,748 | 11/1949 | Burney | 89/1.7 |
| 3,288,244 | 11/1966 | Kirby | 181/119 |
| 3,514,071 | 5/1970 | Moffatt | 181/119 |
| 4,095,667 | 6/1978 | Mahig | 181/121 |

FOREIGN PATENT DOCUMENTS 578595  6/1959 Canada ....................... 89/1.7
473140  6/1975 U.S.S.R. ..................... 181/117

Primary Examiner—Nelson Moskowitz
Attorney, Agent, or Firm—Robert M. Betz

[57] ABSTRACT

Apparatus for generating an acoustic pulse in a medium including an upstanding cylindrical housing within which an impact piston supported by retainer springs is adapted to be propelled downwardly by high pressure expanding gas supplied from external high volume accumulators so as to a strike target plate resting on the ground adjacent the lower end of the housing. A small valve in the top of the cylinder is opened to supply sufficient gas pressure to overcome the spring bias and initiate piston motion. When the piston moves downward far enough to expose multiple large area ports in the housing side wall interconnected with the accumulators, the sudden inflow of gas pressure produces rapid piston acceleration and high energy impact with the target.

6 Claims, 2 Drawing Figures

ACOUSTIC PULSE GENERATOR

BACKGROUND OF THE INVENTION

This invention relates generally to the field of seismic prospecting and more particularly to a method and apparatus for injecting an acoustic pulse into the earth. In applicant's co-pending, commonly assigned application Ser. No. 83,081 entitled Method And Apparatus For Generating A High Frequency, High Energy Acoustic Pulse, a truck-mounted apparatus is described wherein gas pressure may be employed to propel a guided impact mass downwardly against a rigid target resting on the ground. In order to maximize the kinetic energy of the impact mass at the moment it strikes the target in a device of this character the driving force must also be maximized throughout the downward travel of the mass. Any time delay after activation of such a device during which gas pressure is developing is therefore to be avoided.

It is therefore an object of the present invention to provide an acoustic pulse generator of the type described with improved mass acceleration means.

It is a more particular object of the present invention to provide improved means for applying pressurized gas as an energy source in an acoustic pulse generator of the type described.

Other and further objects and advantages of the invention will become apparent from a consideration of the detailed description and drawings to follow.

SUMMARY OF THE INVENTION

In accordance with the preferred embodiment of this invention a hollow cylindrical housing having a substantially closed top and open bottom and adapted to be supported above the ground in a substantially upright position slidably engages an elongated impact piston supported by spring means. A target plate is positioned adjacent the bottom of the housing in spaced relation with the piston and in axial alignment therewith. A source of compressed gas external to the housing is interconnected with the bore of the housing through a valve-controlled inlet in the top above the piston and also through multiple large area ports in the housing sidewall. In operation, the valve is operated to release a small amount of gas pressure sufficient to overcome the spring bias and produce an initial downward displacement of the piston. When downward piston travel exposes the sidewall ports the compressed gas pressure is released suddenly to drive the piston with high velocity to deliver a blow to the target plate, generating an acoustic pulse. Vent means are provided in the top of the housing for simultaneously discharging the compressed gas from within the housing in an upward direction to produce a downward recoil compensating force on the housing. The spring means strained by the downward displacement of the piston are thereafter adapted to return it to its initial position.

DESCRIPTION OF THE PREFERRED EMBODIMENTS

Figure 1:
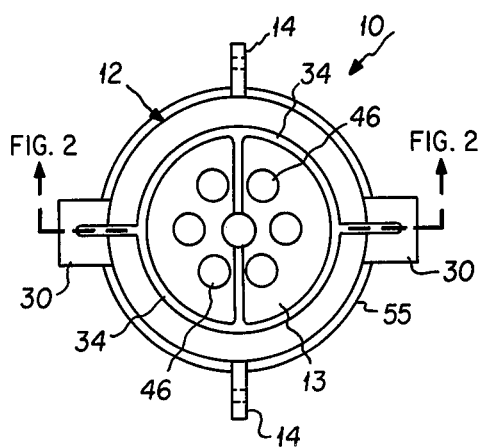
FIG. 1 is a plan view of the apparatus in FIG. 1 shown as carried by a transport vehicle.
Figure 2:
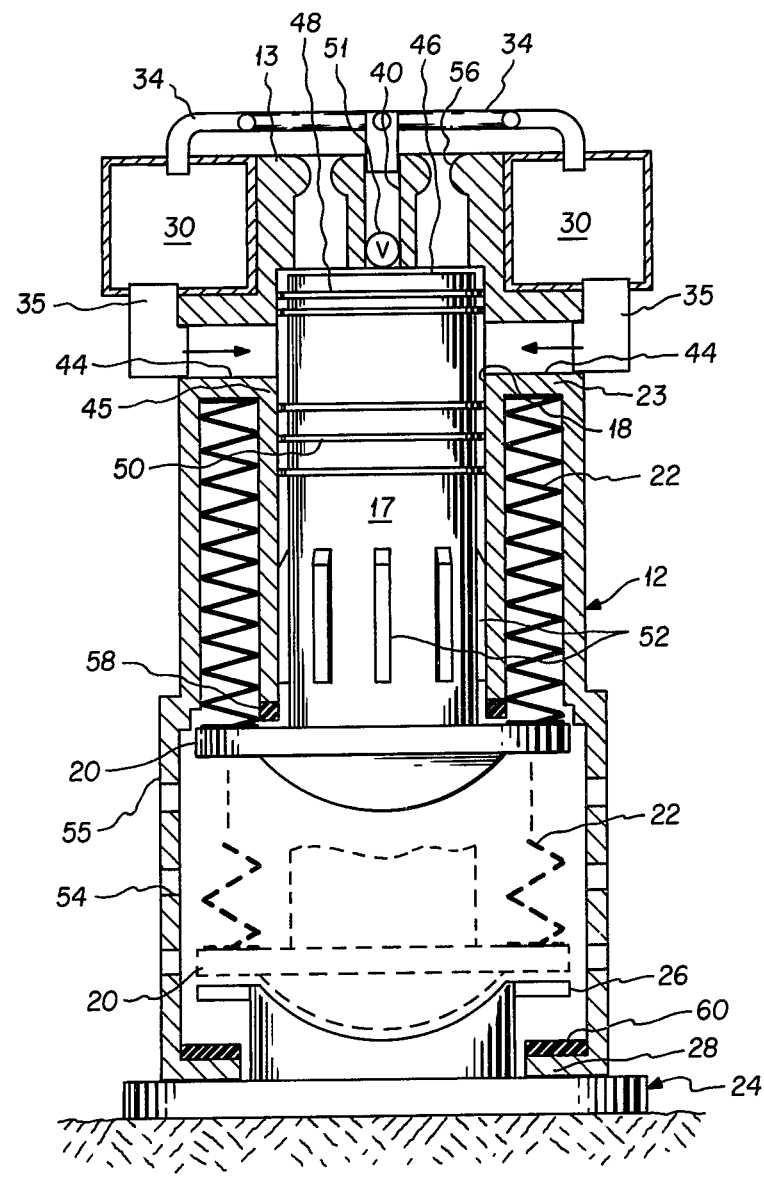
FIG. 2 is an elevational view, partially in section, of the apparatus of FIG. 1 taken along the line 2—2.

With reference now to the drawings, FIGS. 1 and 2 illustrate an acoustic pulse generating apparatus 10 in accordance with a preferred embodiment of this invention. A hollow cylindrical housing 12 having a closed top 13 and an open bottom is adapted to be supported in an upright position. Lugs 14 on the side wall of housing 12 may be engaged by any appropriate means to lift generator 10 for deployment or mounting on a transport vehicle. An impact mass movable with respect to housing 12 consists of an elongated piston 17 slidable within bore 18, the lower end of piston 17 being provided with an enlarged diameter impacting plate 20 positioned beneath the bore 18. Piston 17 is supported by means of a pair of similar recovery springs 22 mounted on opposite sides of the housing 12, their upper and lower ends being connected respectively to spring guides 23 and to the periphery of plate 20.

A heavy target plate 24 is adapted to rest on the ground adjacent the bottom housing 12 in axial alignment with piston 17. Target plate 24 is provided with an upper peripheral flange 26 which extends radially over a matching inwardly extending catcher 28 at the lower end of housing 12. In this manner the target plate 24 may be lifted for transport or deployment from one location to another. The vertical clearance between flange 26 and catcher 28 is made sufficient to permit the expected downward travel of target plate 24 responsive to a blow from plate 20 of piston 17.

The generator 10 is provided with one or more large volume compressed gas accumulators 30 which may be mounted on the exterior of housing 12 as shown or supported separately. Suitable conduits 34 and 35 interconnect the accumulators 30 respectively with upper gas inlet 40 in the top 13 of housing 12 and multiple large area ports 44 extending through its sidewall 45. In the initial or firing position of piston 17, as shown in FIG. 2, its side wall blocks the inner opening of ports 44. To prevent gas pressure from leaking through ports 44 above the face 46 of piston 17 and downwardly along bore 18, piston 17 is provided with upper and lower seal rings 48 and 50. Passage of gas compressed through inlet 40 is controlled by solenoid valve 51. Vertical bearing strips 52 with tapered upper ends ensure proper up and down guidance of piston 17.

In operation, the opening of valve 51 admits gas into bore 18 through inlet 40 to exert sufficient force against the piston 17 to overcome the bias of springs 22, thus initiating its downward displacement. As soon as the face 46 of piston 17 has at least partially cleared the ports 44, a large volume of gas rushes into bore 17 from sources 30 to further propel piston 17 downwardly, causing plate 20 to deliver a blow to target plate 24, thus generating the desired acoustic pulse. During travel of piston 17 air trapped beneath plate 20 is expelled through multiple escape holes 54 in the lower sidewall 55 of housing 12. The sudden application of gas pressure across the entire face 46, insures that a large driving force is applied during a substantial portion of the downward travel of piston 17. Clearly, the amount of displacement of piston 17 prior to the application of this large force may be reduced without difficulty to an inch or less. Furthermore, the force available can readily be increased by increasing the size and number of accumulators 30.

As piston 17 is driven downwardly at high velocity, the expanding gas pressure in bore 18 is simultaneously discharged upwardly through constricted vent passages 56 in top 13. This in turn produces a force downwardly against housing 12 which effectively compensates for the upper recoil force which it would otherwise experience. As a result, the force in the vertical direction against housing 12 and consequently against the supporting vehicle is minimized or eliminated, thus providing true shock isolation.

Upon return of piston 17 to its initial position through the operation of recovery springs 22, damage to housing 12 through possible over travel is prevented by resilient guard ring 58 at the lower end of spring guides 23. In like manner the upper surface of catcher 28 is provided with resilient layer 60 to cushion any possible contact with flange 26 due to excessive downward travel of target 24.

It should be understood that within the scope of this invention other means may be employed to accomplish initial or downward travel of piston 18, including freefall under gravity. This could, for example, be accomplished by eliminating return springs 22 and providing latching detents (not shown) extending inwardly from the housing 12 beneath the plate 20.

It is understood that the preceding description and drawings are illustrative only.

Without departing from the scope of this invention, as set forth in the appended claims those skilled in the art will be able to make many modifications in the configuration and relative position of the various parts of the apparatus.

I claim:

1. Apparatus for generating an acoustic pulse in a medium comprising
   (a) a hollow cylindrical housing having a closed top and open bottom and adapted to be supported in an upstanding position, the sidewall of said housing being penetrated adjacent said closed top by one or more ports,
   (b) an impact piston movable within said housing
   (c) means for supporting said impact piston so as to block said ports
   (d) a source of compressed gas interconnected with said ports
   (e) means acting in opposition to said support means for effecting an initial downward displacement of said impact piston sufficient to clear said ports, thereby releasing said compressed gas within said housing to drive said impact piston downwardly to deliver a blow to a target positioned adjacent said housing bottom.

2. Apparatus as claimed in claim 1 wherein said support means comprises a spring.

3. Apparatus as in claim 2 wherein said closed top is provided with a valve controlled inlet adapted to introduce compressed gas from said source above said piston to effect said initial displacement.

4. Apparatus as claimed in claim 3 wherein the force producing said initial displacement is small in relation to the force applied to said impact piston subsequent thereto.

5. Apparatus as in claim 1 wherein said closed top is provided with upwardly extending vents for reacting said compressed gas to compensate for the recoil of said housing.

6. Apparatus as in claim 1 wherein the total combined cross sectional area of said ports is large in relation to the cross sectional area of said cylindrical housing.

* * * * *